US012679361B2

(12) United States Patent
Seifer et al.

(10) Patent No.: US 12,679,361 B2
(45) Date of Patent: *Jul. 14, 2026

(54) TRANSMISSION SETTING SELECTION AND AUXILIARY BRAKING CONTROL SYSTEM

(71) Applicant: Cummins Inc., Columbus, IN (US)

(72) Inventors: Ethan Charles Seifer, Columbus, IN (US); Ryan Eugene Edgecomb, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/984,985

(22) Filed: Dec. 17, 2024

(65) Prior Publication Data

US 2026/0167229 A1     Jun. 18, 2026

Related U.S. Application Data

(63) Continuation of application No. 18/571,155, filed as application No. PCT/US2022/033649 on Jun. 15, 2022, now Pat. No. 12,202,478.

(60) Provisional application No. 63/211,250, filed on Jun. 16, 2021.

(51) Int. Cl.
| | |
|---|---|
| *B60W 10/30* | (2006.01) |
| *B60W 10/10* | (2012.01) |
| *B60W 60/00* | (2020.01) |

(52) U.S. Cl.
CPC ........ B60W 60/0018 (2020.02); B60W 10/10 (2013.01); B60W 10/30 (2013.01); B60W 2552/15 (2020.02)

(58) Field of Classification Search
CPC .. B60W 10/10; B60W 10/30; B60W 60/0018; B60W 2552/15
See application file for complete search history.

(56) References Cited

U.S. PATENT DOCUMENTS

| | | | |
|---|---|---|---|
| 4,961,484 A | 10/1990 | Kato et al. | |
| 5,257,188 A | 10/1993 | Sakakibara et al. | |
| 5,445,128 A | 8/1995 | Letang et al. | |
| 5,928,107 A | 7/1999 | Bieber | |
| 6,182,000 B1 | 1/2001 | Ohta et al. | |
| 11,673,554 B2 * | 6/2023 | Dempsey .............. | B60W 10/06 477/118 |
| 12,202,478 B2 * | 1/2025 | Seifer ............... | B60W 50/0205 |

(Continued)

OTHER PUBLICATIONS

International Search Report on PCT PCT/US2022/033649 DTD Sep. 23, 2022.

(Continued)

*Primary Examiner* — Edwin A Young
(74) *Attorney, Agent, or Firm* — Foley & Lardner LLP

(57)     ABSTRACT

Systems, apparatuses, and methods for controlling a transmission and other systems and components based on operation of an auxiliary braking system for a vehicle are disclosed. A controller includes one or more processing circuits, and is configured to: receive data regarding operation of an auxiliary brake system of the vehicle; determine an auxiliary brake fault condition based on the received data regarding operation of the auxiliary brake system; determine that a vehicle speed is greater than a requested vehicle speed; and control a transmission to downshift at least one setting relative to a current transmission setting.

20 Claims, 3 Drawing Sheets

(56) References Cited

U.S. PATENT DOCUMENTS

| | | |
|---|---|---|
| 2003/0036839 A1 | 2/2003 | Han et al. |
| 2010/0168946 A1 | 7/2010 | Snyder |
| 2017/0066446 A1 | 3/2017 | Byun |
| 2017/0240167 A1 | 8/2017 | Lu et al. |
| 2018/0072292 A1 | 3/2018 | Renaud |

OTHER PUBLICATIONS

Lingman, P. Integrated Brake Control: Downhill Driving Strategies. Chalmers University of Technology, Department of Applied Mechanics, Doctoral Thesis. 2005 [retrieved on Sep. 2, 2022] Retrieved from the Internet <https://www.me.chalmers.se/~mwahde/Adaptive Systems/PhDTheses/PeterLingman_PhDThesis.pdf>; entire document, especially p. ix, para 11, p. 1, para 6, p. 3, para 1, p. 3, para 4, p. 11, para 3, p. 11, para 5, p. 12, para 1, p. 13, fig 2.9 caption, p. 29, para 1, p. 34, para 2-3, p. 36, pa.

Notice of Allowance on U.S. Appl. No. 18/571,155 DTD Sep. 13, 2024.

PCT Preliminary Report on Patentability for International Application No. PCT/US2022/033649 mailing date Dec. 28, 2023, 12 pages.

SAE On-Road Automated Vehicle Standards Committee. "Surface Vehicle Recommended Practice J3016", Sae International, Jan. 2014, revised Jun. 2018, 35 pages.

Extended European Search Report issued for European Patent Application No. 22825754.9 issued Mar. 24, 2025.

* cited by examiner

TRANSMISSION SETTING SELECTION AND AUXILIARY BRAKING CONTROL SYSTEM

CROSS REFERENCE TO RELATED APPLICATIONS

This application is a continuation of U.S. application Ser. No. 18/571,155, filed Dec. 15, 2023, which is a U.S. national phase application of PCT Application No. PCT/US2022/033649, filed on Jun. 15, 2022, which claims the benefit of and priority to U.S. Provisional Patent Application No. 63/211,250, filed on Jun. 16, 2021, all of which are incorporated herein by reference in their entireties and for all purposes.

TECHNICAL FIELD

The present disclosure relates to vehicle control. More particularly, the present disclosure relates to systems and methods for controlling a transmission among other potential vehicle speed control actuators based on a failure or a potential failure of an auxiliary brake system of a vehicle.

BACKGROUND

Vehicles can include wheel-based brakes (also known as service brakes) and auxiliary brakes. Wheel-based brakes may include friction braking that slows a rotor of the wheel to slow the vehicle. However, some vehicles are equipped with auxiliary brakes to further help slow the vehicle (e.g., engine brakes such as compression braking). Auxiliary brakes may be employed in heavy duty vehicles (e.g., line haul trucks) that have substantial amounts of inertia and may need or require additional braking in certain circumstances.

SUMMARY

One embodiment relates to a controller for a vehicle that includes one or more processing circuits comprising one or more memory devices coupled to one or more processors, the one or more memory devices configured to store instructions thereon that, when executed by the one or more processors, cause the one or more processors to: receive data regarding operation of an auxiliary brake system of the vehicle, determine an auxiliary brake fault condition based on the received data regarding operation of the auxiliary brake system, determine that the vehicle is on or is about to experience a negative road grade, determine a vehicle speed is greater than a requested vehicle speed for the negative road grade, and control a transmission to downshift at least two settings relative to a current transmission setting.

Another embodiment relates to a method that includes receiving, by a controller, data regarding operation of an auxiliary brake system of a vehicle; determining, by the controller, an auxiliary brake fault condition based on the received data regarding operation of the auxiliary brake system; determining, by the controller, that the vehicle is on or is about to experience a negative road grade; determining, by the controller, a vehicle speed that is greater than a requested vehicle speed for the negative road grade; and controlling, by the controller, a transmission to downshift at least two settings relative to a current transmission setting.

Another embodiment relates to a non-transitory computer readable media having computer-executable instructions stored therein that, when executed by a computing system, causes the computing system to perform operations including receiving data regarding operation of an auxiliary brake system of a vehicle associated with the computing system, determining an auxiliary brake fault condition based on the received data regarding operation of the auxiliary brake system, determining that the vehicle is on or is about to experience a negative road grade, determining a vehicle speed is greater than a requested vehicle speed for the negative road grade, and controlling a transmission to downshift at least two settings relative to a current transmission setting.

In some embodiments, if there is an existing auxiliary brake system fault condition, the controller decreases the requested vehicle speed from a current requested vehicle speed to a modified requested vehicle speed. For example, if a cruise control based current requested vehicle speed is set at 55 miles per hour ("MPH" or "mph") and the vehicle is or is about to descend a hill while there is an existing auxiliary brake system fault condition, the controller may determine a modified requested vehicle speed of 50 mph (e.g., or another predetermined amount lower than the current requested vehicle speed).

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
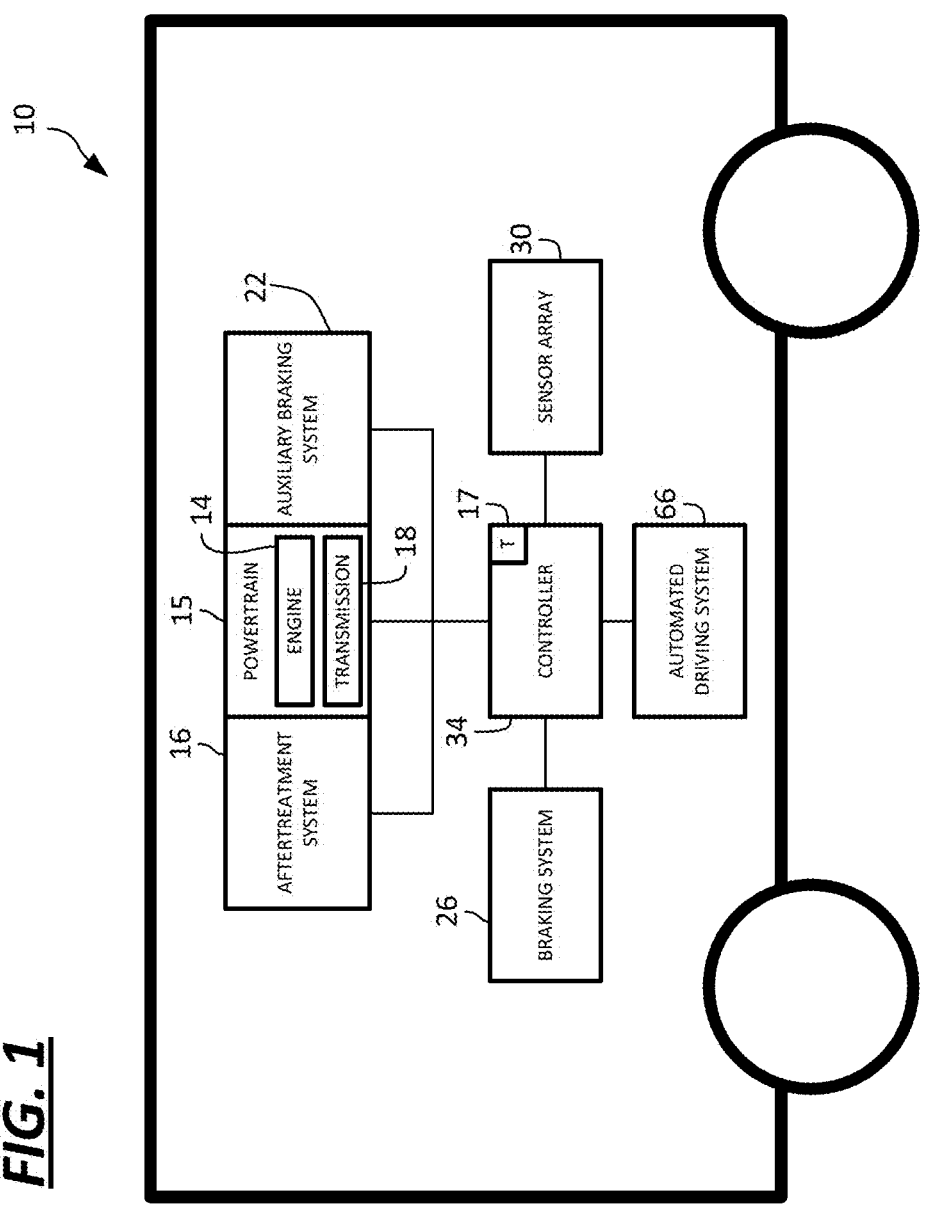
FIG. 1 is a schematic representation of a vehicle, according to an example embodiment.

Following below are more detailed descriptions of various concepts related to, and implementations of, methods, apparatuses, and systems for an auxiliary brake system for a vehicle. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the Figures generally, the various embodiments disclosed herein relate to systems, apparatuses, and methods for controlling a transmission and other vehicle systems and components based on operation of an auxiliary braking system for a vehicle. The auxiliary brake system includes a controller coupled to or including an automated driving system and a sensor array. The sensor array can determine vehicle characteristics (e.g., road grade, vehicle speed, etc.). The automated driving system includes a transmission control scheme that is used during typical/normal operation of the vehicle (e.g., a transmission shift schedule that defines when transmission shift events occur based on engine speed, vehicle speed, etc.). In another embodiment, the transmission control scheme may be included with the controller or, if the controller is separate from a transmission control unit, included with the transmission control unit. In the event of an auxiliary brake failure (e.g., engine brake failure or other auxiliary braking failure), the controller recognizes the failure (e.g., an engine brake failure), analyzes the road grade and the vehicle speed, and at least one of adjusts a transmission setting of a transmission of the vehicle or activates one or more parasitic loads (or other auxiliary brakes) to slow the vehicle. In one embodiment, the controller can prompt a change to the normal transmission control scheme. For example, the controller can request an additional downshift. In this way, the controller may deviate from the transmission shift schedule which transforms operation of the controller to a non-normal or atypical manner.

In this regard, when one or more auxiliary braking systems or components are in a failure mode, the control of a transmission setting (e.g., gear) may be different than when the one or more auxiliary brake systems or components are operating as intended (i.e., are not experiencing a failure mode). For example, when a vehicle is descending a hill, if the engine brake, or another auxiliary brake is in a failure mode, the controller may determine that an auxiliary braking failure mode is active and prior to an upcoming maneuver (e.g., the downhill descent), direct the transmission to select a specific gear to accommodate for the lack of auxiliary braking available. In particular, the specific gear is at least two gears lower than the present gear. As a result of this relatively large transmission shift event, the transmission speed differential caused from the downshift functions to the slow the vehicle down during the downhill in a manner that may otherwise be challenging given the auxiliary brake system failure mode. Beneficially, the systems and methods described herein are able to more effectively slow a vehicle that is experiencing one or more failures of an auxiliary brake system.

As utilized herein, the term "failure" or "failure mode" as applied to an auxiliary brake or auxiliary brake system means that the auxiliary brake system is operating outside of normal operating tolerances. The failure may not indicate the complete inoperability of the auxiliary brake, but rather a variance from normal operation in that operation (as determined by operational data regarding auxiliary brake) is outside a predetermined acceptable range of operation. In one embodiment, the failure is determined based on the presence of a fault code regarding operation of the auxiliary brake. In another embodiment, the failure is determined based on comparing (by the controller) operation characteristics of the auxiliary brake to predefined intended operational thresholds even if a fault code is not triggered. As also used herein, the term auxiliary brake or auxiliary braking system refers to brake systems selectively used by the vehicle in addition to service brakes at the wheels or final drives (e.g., the drum or disc brakes). Auxiliary brake systems may include, but are not limited to, electromagnetic retarders that apply a counter torque to the drive shaft and/or wheel axle, a transmission retarder that applies fluid pressure to slow the transmission and in turn vehicle speeds, engine brakes, and/or a parasitic load such as an air conditioning compressor, an electronically controlled air compressor, a radiator fan, and/or another system that consumes energy produced by the engine. The parasitic loads may divert power otherwise used to drive the vehicle to these components or systems thereby slowing down the vehicle. Engine brakes refer to actuators, devices, or systems that slow engine speed to slow the vehicle. Engine brakes may include an exhaust brake where a variable geometry turbocharger (VGT) uses the exhaust pressure to increase a manifold pressure and provide a resistive force to the piston during an exhaust stroke to slow engine speed rotation, and a compression brake (e.g., a Jake brake or engine brake) that exhausts compressed air to remove engine power to slow the engine speed. In some embodiments, the auxiliary brake system may include a regenerative braking system that can be used to slow the vehicle while generating electrical energy for use by the vehicle. The term "auxiliary brake system" or "auxiliary brake" as used herein refers to the aforementioned categories and types of brakes as well as other non-service brakes that may be employed with a vehicle.

Referring now to FIG. 1, a vehicle 10 is shown according to an example embodiment. The vehicle 10 includes an engine 14 structured to produce power, and a transmission 18 coupled to the engine 14 and structured to shift between gears or settings and to supply power to tractive elements (e.g., wheels fitted with tires) to move the vehicle 10. The vehicle 10 may be configured as an on-road or an off-road vehicle including, but not limited to, line-haul trucks, mid-range trucks (e.g., pick-up truck), tanks, and any other type of vehicle that utilizes a transmission. The vehicle 10 may also be an off-highway vehicle such as a piece of heavy machinery (e.g., a wheel loader). The vehicle 10 is shown to generally include a powertrain system 15, an exhaust aftertreatment system 16, a telematics unit 17, and a controller 34, where the controller 34 is coupled to each of the aforementioned components.

The powertrain system 15 facilitates power transfer from the engine 14 to power and/or propel the vehicle 10. The powertrain system 15 includes the engine 14 operably coupled to the transmission 18 that is operatively coupled to a drive shaft. The drive shaft is operatively coupled to a differential, where the differential transfers power output from the engine 14 to the final drive (shown as wheels) to propel the vehicle 10. In another not-depicted embodiment, the powertrain may be at least partially electrified (e.g., a series or parallel hybrid vehicle, full electric vehicle, etc.). In this configuration, motive power for the final drive may be provided by one or more electric motors in place of or in addition to the power from the engine 14.

As a brief overview, the engine 14 receives a chemical energy input (e.g., a fuel such as gasoline or diesel) and combusts the fuel to generate mechanical energy, in the form of a rotating crankshaft. As a result of the power output from the engine 14, the transmission 18 may manipulate the speed of the rotating input shaft (e.g., the crankshaft) to effect a desired drive shaft speed. The rotating drive shaft is received by a differential, which provides the rotation energy of the drive shaft to the final drive. The final drive then propels or moves the vehicle 10.

The engine 14 may be structured as any internal combustion engine (e.g., compression-ignition or spark-ignition), such that it can be powered by any fuel type (e.g., diesel, ethanol, gasoline, etc.). In the example shown, the engine 14 is structured as a compression-ignition diesel powered engine. Furthermore, the transmission 18 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. In the example shown, the transmission is structured as a geared transmission including a plurality of gear settings. Like the engine 14 and the transmission 18, the drive shaft, differential, and final drive may be structured in any configuration dependent on the application (e.g., the final drive is structured as wheels in an automotive application). Further, the drive shaft may be structured as a one-piece, two-piece, and a slip-in-tube driveshaft based on the application.

As also shown, the vehicle 10 includes the exhaust aftertreatment system 16 coupled to the engine 14. The exhaust aftertreatment system 16 receives exhaust gas from the combustion process in the engine 14 and reduces the emissions from the engine 14 to less environmentally harmful emissions (e.g., reduce the NOx amount, reduce the emitted particulate matter amount, etc.). The exhaust aftertreatment system 16 may include a variety of components used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 16 (e.g., a NOx sensor). It should be understood that other embodiments may exclude an exhaust aftertreatment system and/or include different, less than, and/or additional components than that listed above. All such variations are intended to fall within the spirit and scope of the present disclosure.

The vehicle 10 is also shown to include the telematics unit 17. The telematics unit 17 may be structured as any type of telematics control unit. Accordingly, the telematics unit 17 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 17 and one or more remote devices (e.g., a provider/manufacturer of the telematics device, etc.). The telematics unit 17, can communicate with remote servers, other vehicles, and other systems remote to the vehicle (i.e., V-2-X, where "X" can be another vehicle, a remote server, etc.). In this regard, the communications interface may be configured as any type of mobile communications interface or protocol including, but not limited to, Wi-Fi, WiMax, Internet, Radio, Bluetooth, ZigBee, satellite, radio, Cellular, GSM, GPRS, LTE, and the like. The telematics unit 17 may also include a communications interface for communicating with the controller 34 of the vehicle 10. The communication interface for communicating with the controller 34 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, ZigBee, cellular, radio, etc. In one embodiment, a controller area network (CAN) bus including any number of wired and wireless connections provides the exchange of signals, information, and/or data between the controller 34 and the telematics unit 17. In other embodiments, a local area network (LAN), a wide area network (WAN), or an external computer (for example, through the Internet using an Internet Service Provider) may provide, facilitate, and support communication between the telematics unit 17 and the controller 34. In still another embodiment, the communication between the telematics unit 17 and the controller 34 is via the unified diagnostic services (UDS) protocol. All such variations are intended to fall within the spirit and scope of the present disclosure.

The vehicle 10 also includes an auxiliary brake system 22 that can include a number of different components. For example, the auxiliary brake system 22 can include a variable geometry turbocharger (VGT), a regenerative braking system, a fan (e.g., a radiator fan), and other auxiliary brake systems described above (e.g., engine brakes, etc.). As such, the auxiliary brake system 22 can include a component that consumes power produced by the engine 14 (a parasitic load, such as a fan) and/or reduces the power produced by the engine 14 (e.g., compression or exhaust braking) to slow the vehicle 10. For example, a VGT can be used for exhaust braking.

The vehicle 10 also includes a braking system 26, which is shown as a service brake system structured to slow the vehicle 10 and a sensor array 30 that is structured to determine operational characteristics, data, or information of the vehicle 10. The braking system 26 may include drum or disc brakes or other types of service brakes for the wheels of the vehicles. The sensor array 30 can include a road grade sensor, a vehicle speed sensor, a look ahead system, and other sensors to determine how the vehicle 10 is operating.

Figure 2:
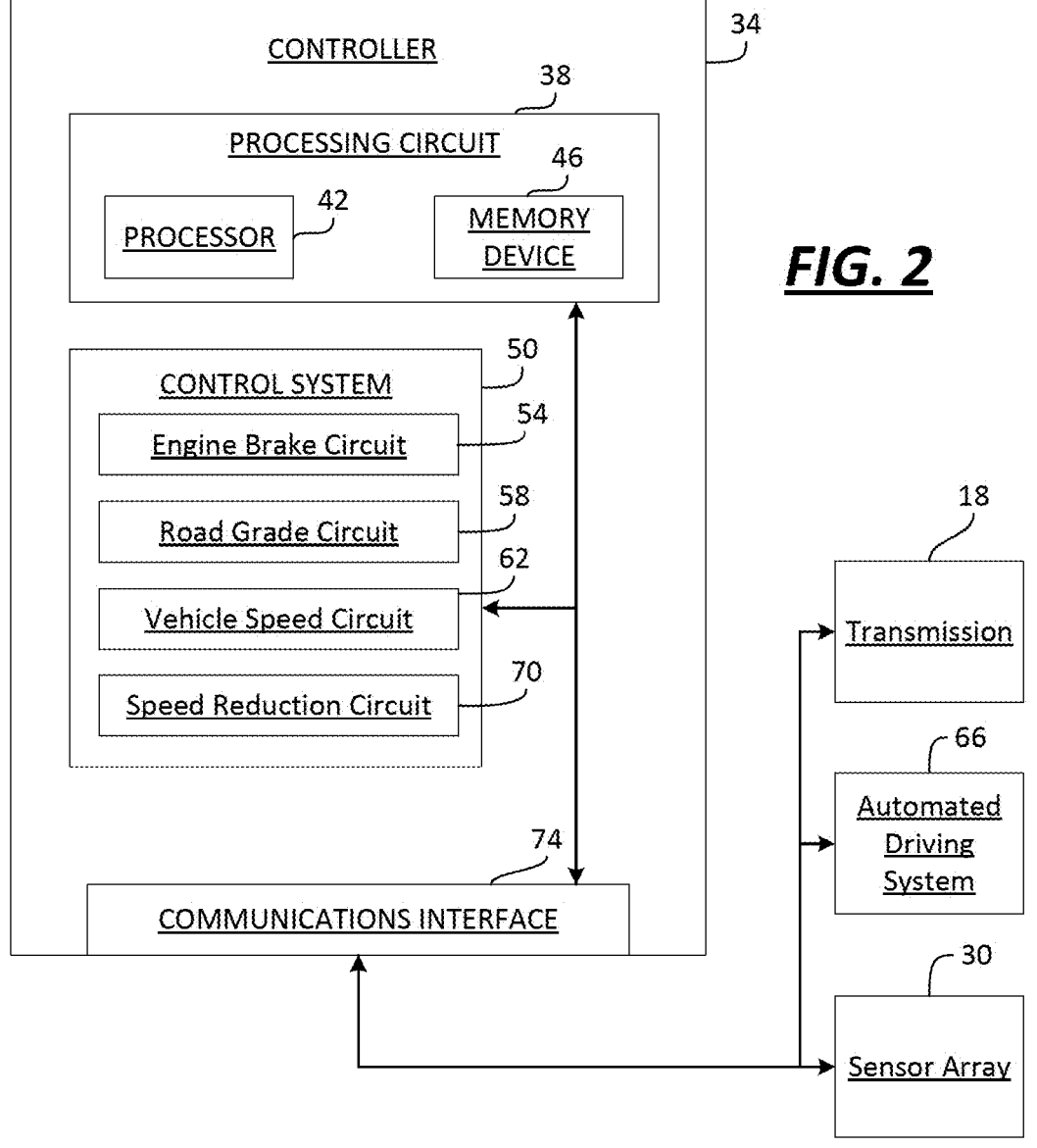
FIG. 2 is a schematic representation of a controller of the vehicle of FIG. 1, according to an example embodiment.

A controller 34 is coupled to the engine 14, the transmission 18, the auxiliary systems 22, the braking system 26, and the sensor array 30. The controller 34 is structured to control, at least partly, operation of the vehicle 10. In an alternate embodiment, the controller 34 includes an automated driving system that automatically controls operation (or at least certain systems) of the vehicle 10. As shown in FIG. 2, the controller 34 is coupled to the automated driving system 66.

Depending on the configuration of the vehicle 10 and automated driving system 66, the automated driving system 66 may control various functionalities of the vehicle 10. In this way and consistent with SAE J3016 (see SAE J3016, dated June 2018, and titled Taxonomy and Definitions for Terms Related to Driving Automation Systems for On-Road Motor Vehicles, which is incorporated herein by reference in its entirety) there may be five levels of automation. Depending on the configuration and the automated driving system 66, the automated driving system 66 may enable up to a level 5 of automation, which enables full automated driving. Level 0 provides for no driving automation, Level 1 provides for some driver assistance, Level 2 provides for partial driving automation, Level 3 provides for conditional driving automation, Level 4 provides for high driving automation, and Level 5 (the highest level) provides for full driving automation. The systems, methods, and apparatuses described herein are applicable with Level 1 through Level 5 and, preferably, with Level 3 through Level 5 automation. Thus, the automated driving system 66 may enable at least a Level 1, and preferably, a minimum of a Level 3 of automation of the vehicle 10.

Thus and depending on the level of automation, the automated driving system 66 may, for example, control gear shifting of the transmission 18 automatically without input from a human driver (i.e., an automatic transmission), apply the braking system 26, engage an auxiliary brake, etc. The automated driving system 66 can include one or more automated vehicular systems within an otherwise manually operated vehicle, such as an automatically shifted transmission. In another configuration, the automated driving system 66 refers to the components and systems to provide a Level 1 and up (e.g., Level 1, 2, 3, 4 and/or 5) automated vehicle driving system 66 comprised of many individual vehicular systems that are automatically controlled. As mentioned above and in one embodiment, the automated driving system 66 includes an automatically controlled transmission that includes a shifting or gear selection scheme that automatically selects and shifts to gears within the transmission 18 automatically without human intervention. In another example embodiment when the transmission is structured as a manual transmission (i.e., where the operator controls the transmission shifting), the controller 34 can prompt a human operator to enact a transmission setting change via visual, audible, and/or tactile prompts. For example, a user interface on the dashboard may receive a signal from the controller 34 to prompt a driver to double downshift the manual transmission. For example, the interface may be an operator input/output device that may include, but is not limited to, an interactive display, a touchscreen device, one or more buttons and switches, voice command receivers, etc.

As the components of FIG. 1 are shown to be embodied in a vehicle, the controller 34 may be structured as one or more electronic control units (ECU). The function and structure of the controller 34 is described in greater detail in FIG. 2. The controller 34, or parts thereof, may be separate from or included with at least one of a transmission control unit, an exhaust aftertreatment control unit, a powertrain control module, an engine control module, etc. In one embodiment, the depicted components of the controller 34 are combined into a single unit. In another embodiment, one or more of the components of the controller 34 (or other controllers not depicted, such as an aftertreatment system controller, etc.) may be geographically dispersed throughout the vehicle (e.g., in separate locations of the vehicle). When there are multiple controllers or components, a datalink (e.g., a J1939 communication network) or CAN bus may connect the multiple controllers to provide shared information. The datalink (or other communication structures) allow the controller 34 to recognize faults, failures, and other information from each of the connected controllers or components. The function and structure of the controller 34 is described in greater detail in FIG. 2.

Referring now to FIG. 2, a schematic diagram of the controller 34 of the vehicle 10 of FIG. 1 is shown, according to an example embodiment. As shown in FIG. 2, the controller 34 includes a processing circuit 38 having a processor 42 and a memory or memory device 46; a control system 50 coupled to the processing circuit 38, the control system having an auxiliary brake circuit 54, a road grade circuit 58, a vehicle speed circuit 62, and a speed reduction circuit 70; and a communications interface 74. The controller 34 is structured to determine that a component or portion of the auxiliary brake system 22 is in a failure mode and reduce the speed of the vehicle 10 using other portions or components of the auxiliary brake system 22 and/or by implementing an additional downshift with the transmission 18.

In one configuration, the auxiliary brake circuit 54, the road grade circuit 58, the vehicle speed circuit 62, and the speed reduction circuit 70 are embodied as machine or computer-readable media that stores instructions and that is executable by a processor, such as processor 42. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the auxiliary brake circuit 54, the road grade circuit 58, the vehicle speed circuit 62, and the speed reduction circuit 70 are embodied as hardware units, such as electronic control units. As such, the auxiliary brake circuit 54, the road grade circuit 58, the vehicle speed circuit 62, and the speed reduction circuit 70 may be embodied as one or more circuitry components including, but not limited to, processing circuitry, network interfaces, peripheral devices, input devices, output devices, sensors, etc. In some embodiments, the auxiliary brake circuit 54, the road grade circuit 58, the vehicle speed circuit 62, and the speed reduction circuit 70 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the auxiliary brake circuit 54, the road grade circuit 58, the vehicle speed circuit 62, and the speed reduction circuit 70 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The auxiliary brake circuit 54, the road grade circuit 58, the vehicle speed circuit 62, and the speed reduction circuit 70 may also include programmable hardware devices such as field programmable gate arrays, programmable array logic, programmable logic devices or the like. The auxiliary brake circuit 54, the road grade circuit 58, the vehicle speed circuit 62, and the speed reduction circuit 70 may include one or more memory devices for storing instructions that are executable by the processor(s) of the auxiliary brake circuit 54, the road grade circuit 58, the vehicle speed circuit 62, and the speed reduction circuit 70. The one or more memory devices and processor(s) may have the same definition as provided below with respect to the memory device 46 and processor 42. In some hardware unit configurations, the auxiliary brake circuit 54, the road grade circuit 58, the vehicle speed circuit 62, and the speed reduction circuit 70 may be geographically dispersed throughout separate locations in the vehicle. Alternatively and as shown, the auxiliary brake circuit 54, the road grade circuit 58, the vehicle speed circuit 62, and the speed reduction circuit 70 may be embodied in or within a single unit/housing, which is shown as the controller 34.

In the example shown, the controller 34 includes the processing circuit 38 having the processor 42 and the memory device 46. The processing circuit 38 may be structured or configured to execute or implement the instructions, commands, and/or control processes described herein with respect to auxiliary brake circuit 54, the road grade circuit 58, the vehicle speed circuit 62, and the speed reduction circuit 70. The depicted configuration represents the auxiliary brake circuit 54, the road grade circuit 58, the vehicle speed circuit 62, and the speed reduction circuit 70 as instructions stored in non-transitory machine or computer-readable media. However, as mentioned above, this illustration is not meant to be limiting as the present disclosure contemplates other embodiments where the auxiliary brake circuit 54, the road grade circuit 58, the vehicle speed circuit 62, and the speed reduction circuit 70, or at least one circuit of the auxiliary brake circuit 54, the road grade circuit 58, the vehicle speed circuit 62, and the speed reduction circuit 70, is configured as a hardware unit. All such combinations and variations are intended to fall within the scope of the present disclosure.

The processor 42 may be one or more of a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. In this way, the processor 42 may be a microprocessor, or state machine, or other suitable processor. The processor 42 also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., auxiliary brake circuit 54, the road grade circuit 58, the vehicle speed circuit 62, and the speed reduction circuit 70 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 46 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 46 may be communicably connected to the processor 42 to provide computer code or instructions to the processor 42 for executing at least some of the processes described herein. Moreover, the memory device 46 may be or include tangible, non-transient volatile memory or non-volatile memory. Accordingly, the memory device 46 may include database components, object code components, script components, or any other type of information structure for supporting the various activities and information structures described herein.

The auxiliary brake circuit 54 is structured to determine an operational status of the auxiliary braking system 22 of the vehicle 10 and, as such, is coupled to the auxiliary brake system 22. During normal operation, the operational status of the auxiliary brake system 22 is operational or in a no-fault condition. If the auxiliary brake system 22 is unable to provide stopping power or is providing less stopping power than intended, then the auxiliary brake circuit 54 identifies an auxiliary brake failure status. In some embodiments, an auxiliary brake failure status can include an engine brake failure that is based on a fault code. In some embodiments, an auxiliary brake failure status can include a direct communication from a telematics device indicating a failure mode (e.g., a recall is implemented indicating a potential future failure). For example, via a telematics unit, the controller 34 receives an indication that while no fault code(s) is being triggered, the engine brakes in this vehicle or engine configuration have been faulty. Accordingly, the auxiliary brake circuit 54 may determine a fault condition with respect to the engine brakes based on this message. In some embodiments and as alluded to above, an auxiliary brake failure status can be determined based on a direct measurement via one or more sensors (e.g., operational data of the auxiliary brake is shown to be outside a predefined acceptable range thereby indicating a failure), or another form of a failure determination. For example, the engine brake (e.g., compression braking or exhaust braking) may seemingly be operating normally but the stopping power is less than expected. This may be determined based on the time to slow down to a predefined speed using the engine brakes at a certain vehicle speed. For example, for this vehicle configuration, it typically takes ten seconds to slow from 60 MPH to 15 MPH on a certain road grade level. However, it recently took ten seconds plus an additional predefined amount of time (e.g., ten seconds). As such, the auxiliary brake circuit 54 may determine a fault or failure mode for the engine brakes due to this operational characteristic. This determination may be based on how the engine brakes are operating over a predefined period of time or based on a single occurrence, like described above. In some embodiments, the operational status of the auxiliary brake system 22 is determined via a DM1 J1939 message datalink. Accordingly, it should be appreciated that a failure or failure mode of an auxiliary brake (e.g., engine brake) may be determined via a variety of different ways.

The road grade circuit 58 is structured to communicate with the sensor array 30 and identify a road grade for a path of the vehicle (e.g., at an upcoming particular location, at the instant location that the vehicle is traversing, and/or a combination thereof). The path may be set by an operator of the vehicle via an input/output device of the vehicle. Additionally, the path may be determined by the road grade circuit 58 based on extrapolating a predefined distance in front of the vehicle 10. In some embodiments, the sensor array 30 includes an inclinometer (or other road grade sensor type) that determines a current road grade. In some embodiments, the sensor array 30 includes a look ahead system, a GPS unit or other location determination system, or another system capable of determining upcoming road grades and conditions. For example, a look ahead system may recognize that an extended downgrade is upcoming in a predefined distance of the vehicle, and the road grade circuit 58 can process that information within the controller 34.

The vehicle speed circuit 62 is structured to communicate with the sensor array 30 to determine a current vehicle speed, and structured to communicate with the automated driving system 66. In one embodiment, the vehicle speed circuit 62 can compare the current vehicle speed based on the sensor array 30 (e.g., a vehicle speed sensor) with a requested vehicle speed from the automated driving system 66 to determine if the current vehicle speed is at, below, or above a predefined tolerance or hysteresis band of the requested vehicle speed. The requested vehicle speed refers to the desired speed of the vehicle (e.g., 45 MPH) while the current vehicle speed refers to the actual vehicle speed (e.g., 55 MPH). For example, in some embodiments, the hysteresis band is 3 miles per hour above or below the requested vehicle speed. In some embodiments, if there is an existing auxiliary brake system fault condition, the vehicle speed circuit 62 decreases the requested vehicle speed from a current requested vehicle speed to a modified requested vehicle speed by a predefined amount. The predefined amount may be a set value, or may be based on the current requested vehicle speed (e.g., at relatively higher current vehicle speed requests, such as greater than 70 mph, than the predefined amount is greater than at relatively lower current requested vehicle speeds (e.g., 10 mph at speeds greater than 70 mph and 3 mph at speeds less than 45 mph)). For example, if a cruise control based current requested vehicle speed is set at 55 mph and the vehicle is getting ready to descend a hill while there is an existing auxiliary brake system fault, the vehicle speed circuit 62 may determine a modified requested vehicle speed of 50 mph.

The automated driving system 66 is shown coupled to the controller 34. In one embodiment, the automated driving system 66 may include one or more controllers that provide automated operation of the vehicle or certain components thereof (e.g., from Level 1 to Level 5). The one or more controllers may be microcontrollers, include one or more processors and memory devices (which may have the same definition as described herein), and/or other processing components (e.g., communication interfaces, connection ports, etc.). The automated driving system 66 may include one or more actuators for enabling automated operation of the vehicle 10.

In another embodiment, certain functional features of the automated driving system 66 are embodied as a circuit within the controller 34, which in turn, may have the same or similar definition as that described above with respect to, for example, road grade circuit 58. Thus, the functions attributed to the automated driving system 66 herein below may be also, in another embodiment, performed by the controller 34. The automated driving system 66 is structured to control, at least partly, operation of the engine 14 and/or the transmission 18 to operate the vehicle 10. The automated driving system 66 generates the requested vehicle speed and controls shift points and gear shifts of the transmission 18. In some embodiments, such as a fully autonomous vehicle 10 (e.g., a Level 5 automation), the requested vehicle speed is based on a torque request generated by the automated driving system 66. The torque request is provided to the engine 14 and simultaneously to the vehicle speed circuit 62. Accordingly, the torque request may be translated to a vehicle speed and be used as the requested vehicle speed. In another embodiment, the requested vehicle speed is provided via a user interface, such as a brake pedal or a cruise control speed input feature. In another embodiment, the requested vehicle speed is determined based on a combination of accelerator and pedal positions. In another embodiment, the requested vehicle speed is determined based at least in part on preferences that can be set by a user, or predetermined within the system. For example, the requested vehicle speed can be determined based on the posted speed limit of the current roadway. In one example, the requested vehicle speed is three miles an hour faster than the posted speed limit (as received by the telematics unit 17 for example). In another embodiment, the requested vehicle speed is input by the user via a user interface such as a touch screen, a keyboard, a voice activated or voice recognition system, etc. Thus, the requested vehicle speed can be manually input and/or from the autonomous driving system.

As alluded to above, the automated driving system 66 can control one or more automated vehicular systems, such as within an otherwise manually operated vehicle (e.g., an automatically shifted transmission or a full autonomous vehicle). In some embodiments, the automated driving system 66 controls components and systems to provide a fully automated vehicle driving system comprised of many individual vehicular systems that are automatically controlled. In some embodiments, the automated driving system 66 controls an automatically controlled transmission that includes a shifting or gear selection scheme that automatically selects and shifts to gears within the transmission 18 automatically without human intervention. In another example embodiment when the transmission is structured as a manual transmission (i.e., where the operator controls the transmission shifting), the automated driving system 66 can prompt a human operator to enact a change via visual, audible, and/or tactile prompts. For example, a user interface on the dashboard may receive a signal from the controller 34 to prompt a driver to downshift (or, in some embodiments, to provide more particularity such as perform a double downshift) a manual transmission. For example, the interface may be an operator input/output device that may include, but is not limited to, an interactive display, a touchscreen device, one or more buttons and switches, voice command receivers, etc.

The speed reduction circuit 70 is structured to identify an auxiliary brake failure via the auxiliary brake circuit 54 and control any combination of the transmission 18 and the components of the auxiliary brake system 22 to reduce the current vehicle speed when the current vehicle speed is greater than the requested vehicle speed generated by the automated driving system 66. In one embodiment, the failure is based on an auxiliary brake fault code. In another embodiment, the failure is based on any one or more of the aforementioned fault conditions. In yet another embodiment, the failure is an error mode (e.g., Ebs error (DM1)).

Control of the transmission 18 or auxiliary brake system 22 based on a determined auxiliary brake failure may include actuation of a variety of vehicle components to slow the vehicle down. In one embodiment, the speed reduction circuit 70 controls the transmission 18. In particular, the vehicle speed reduction circuit 70 implements a transmission shift where the transmission shift is a downshift relative to a current transmission setting. In particular and in some embodiments, the vehicle speed reduction circuit 70 implements a transmission shift by a predefined number of gear settings lower relative to the instant transmission setting to enable the transmission 18 to at least partly slow the vehicle down. In one embodiment, the predefined number of gear settings is two relative to the current transmission setting (e.g., $8^{th}$ gear to $6^{th}$ gear). In another embodiment, the predefined number of gears is three (e.g., $9^{th}$ gear to $6^{th}$ gear). In another embodiment, the predefined number of gears is one (e.g., $9^{th}$ gear to $8^{th}$ gear). In yet another embodiment, the predefined number of gears is another number (e.g., four, five, six, etc.) down relative to the current transmission setting. Further, this predefined number of gears may be dynamic in nature. For example, if the predefined number of gears is three and the transmission is in second gear, than the circuit 70 implements a one gear downshift ($2^{nd}$ gear to $1^{st}$ gear). Thus, the speed reduction circuit 70 may apply the maximum allowed predefined number of downshift relative to the current setting (for example and when the predefined number is three, $5^{th}$ gear to $2^{nd}$ gear but only $2^{nd}$ gear to $1^{st}$ gear). Applicant has determined that at least two gears lower operates to slow the vehicle down more effectively. In some embodiments, utilizing the current engine speed and road grade, the controller 34 can perform a double downshift to prevent a runaway event (i.e., shift from $11^{th}$ gear to $9^{th}$ gear or $6^{th}$ gear to $4^{th}$ gear).

In another embodiment, the speed reduction circuit 70 may engage or otherwise operate additional components of the auxiliary braking system 22 such as parasitic loads (e.g., a radiator fan) and/or systems that reduce the power produced by the engine (e.g., exhaust braking via controlling the VGT to create backpressure that the engine must overcome during the exhaust stroke of each cylinder that creates additional parasitic load).

Figure 3:
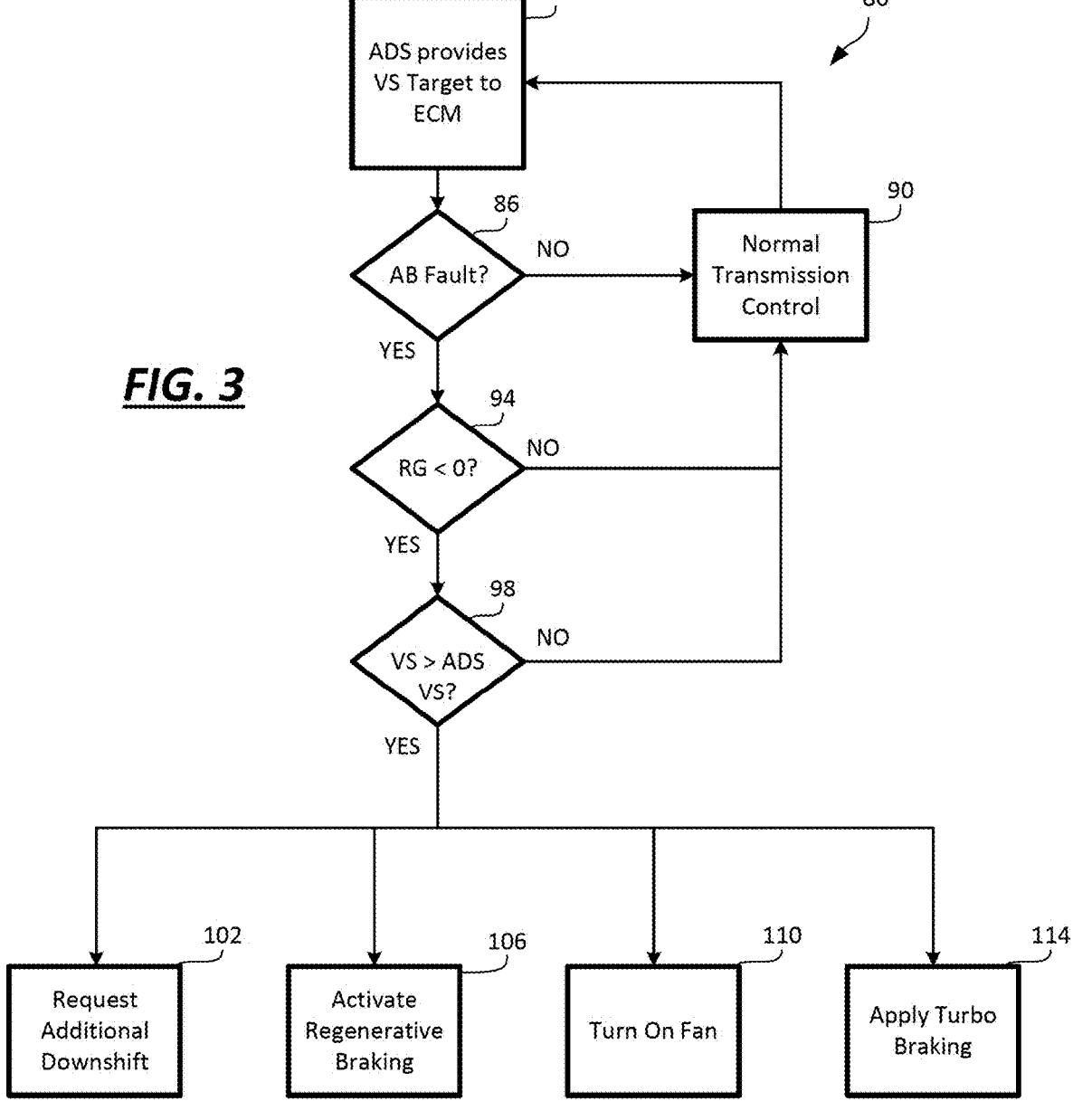
FIG. 3 is a flow diagram of an auxiliary brake system control scheme implemented by the controller of FIG. 2, according to an example embodiment.

Referring now to FIG. 3, a method 80 of operating the vehicle 10 with the controller 34 is shown, according to an example embodiment. At process 82, the automated driving system 66 provides a requested vehicle speed and controls the engine 14 and the transmission 18 to achieve or substantially achieve the requested vehicle speed (the requested or target vehicle speed is shown as "VS" in decision 98 of FIG. 3 while "ADS" refers to the automated driving system 66). In the example shown, the ADS 66 is a separate component or system from the controller 34 (e.g., located in a physically different area relative to the controller 34), which may also be referred to as the ECM. As mentioned above, in another embodiment, the ADS 66 (e.g., ADS circuit 66) is included with the controller 34 such that the controller 34 has knowledge of the target VS automatically or nearly automatically (i.e., no transmission of the target VS like shown in FIG. 3). The requested vehicle speed may be based on a depression amount of an accelerator or brake pedal (e.g., certain amounts correspond with certain speeds or braking forces), a user input (e.g., via a cruise control setting or interface), or another way (e.g., in an autonomous driving mode, the requested speed may be predefined based on various conditions such as the speed limit, grade, traffic conditions, etc.). In some embodiments, the automated driving system 66 recognizes a speed limit and controls the engine 14 (e.g., engine speed and/or engine torque) via control of air handling actuators, fuel handling actuators, and ignition controls, etc. to substantially achieve or maintain the speed limit. The automated driving system 66 can also control the transmission 18 in concert with the engine 14 to provide the result of the vehicle 10 moving over a road or surface at the requested vehicle speed. In some embodiments, the automated driving system 66 operates the vehicle 10 autonomously and controls engine operation, transmission shift points, the service brakes, and other vehicle systems. In some embodiments, the automated driving system 66 may control only one or a subset of vehicle systems. For example, the automated driving system 66 may control an automatically controlled transmission in an otherwise manually operated vehicle 10.

At process 86, the auxiliary brake circuit 54 determines if an auxiliary brake system 22 failure condition exits. Auxiliary brake is abbreviated as "AB" in FIG. 3. The fault or failure condition may be determined, via error codes, faults, sensor determination, communication with a telematics device, etc. as described herein. If no auxiliary brake failure condition exists at process 86, then the method 80 continues normal operation at process 90.

If an auxiliary brake system 22 failure condition is determined at process 86, then the controller 34 determines if the vehicle 10 is on a downhill slope via the road grade circuit 58 at process 94. If the road grade ("RG" in FIG. 3) is zero (e.g., flat ground) or positive (e.g., the vehicle is moving uphill) then the method continues normal operation at process 90. If the road grade is determined to be negative at process 94 which indicates a downhill slope, then the controller 34 compares the current vehicle speed and the requested vehicle speed from the automated driving system 66 using the vehicle speed circuit 62 at process 98. In some embodiments, the road grade is determined in real time and is indicative of the current road grade that the vehicle 10 is travelling over. In some embodiments, a look ahead system can determine that an upcoming downhill road grade may affect the vehicle 10. For example, the vehicle 10 may be currently at the top or crest of a hill and look ahead information received from the look ahead system indicates that an upcoming downhill grade will be experienced as the vehicle 10 moves forward. The recognition of a downhill slope or an upcoming downhill slope can be used to identify a downhill slope via the road grade circuit 58. If the current vehicle speed is less than or equal to the requested vehicle speed, then the method 80 continues to normal operation at process 90.

If the vehicle speed circuit 62 determines at process 98 that the current vehicle speed is greater than the requested vehicle speed from the automated driving system 66, then the controller 34 determines that additional speed reduction is required or may be required via the speed reduction circuit 70. Alternatively and even if the requested vehicle speed is not greater than the current speed, the actions described herein may be implemented. Beneficially, by implementing the actions described herein when the two conditions exist (downhill grade and current vehicle speed greater than requested speed, which indicates that the vehicle is going faster than desired), then the actions are selectively implemented. This may improve operation of the system overall by, for example, not using resources unless certain conditions are met. The speed reduction circuit 70 can then implement any one or more of the following: request an additional downshift at process 102, activate a regenerative braking system at process 106, turn on a parasitic load (shown as fans including the radiator fan) at process 110, and apply engine braking (e.g., exhaust braking, etc.) at process 114. The "additional" downshift requested at process 102 is in addition to any downshifts that would normally be requested during normal operation. Additionally, the auxiliary braking systems 22 can include other components to add to the parasitic load or reduce the power produced by the engine 14. For example, an air conditioning compressor may be activated or another component of the auxiliary braking system 22, as desired. In some embodiments, the automated driving system 66 requests the transmission 18 to do a double downshift. In some embodiments, the auxiliary brake system 22 includes the service brakes 26 and the automated driving system 66 could command the service brakes 26 to be applied for a short period of time to help the transmission 18 facilitate the double downshift. These actions function to slow the vehicle down (e.g., the current vehicle speed is less than the requested vehicle speed).

Many variations of the method 80 can be implemented. In some embodiments, the method 80 is carried out within the engine control module (i.e., the controller 34 is the engine controller). In some embodiments, the method 80 can be implemented within the transmission control module (i.e., the controller 34 or parts thereof are implemented with a transmission controller).

In one exemplary embodiment, the system is structured to identify that an engine braking system is not functioning normally and implement a double downshift if the vehicle is travelling on a downslope and the vehicle speed exceeds a requested vehicle speed. Beneficially, the system can slow the vehicle in the event of an engine brake failure allowing the vehicle to control vehicle speed without only depending on the foundation or service brakes. In some situations, such as driving down a mountain road, continuous use of service brakes can be undesirable and the system disclosed herein can improve vehicle functionality. Beneficially and as described herein, in situations where engine brakes may be used in connection with service brakes, the system may utilize one or more additional auxiliary brakes in situations (e.g., when the requested vehicle speed is greater than a threshold vehicle speed) to slow the vehicle down (e.g., activate a parasitic load, downshift more than a predefined amount of settings such as two, activate regenerative braking, a combination thereof, etc.). Accordingly, even in undesired engine brake failure conditions, the systems and apparatuses described herein beneficially take various actions to aid operation of the service brakes to slow the vehicle.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 34 may include any number of circuits for completing the functions described herein. For example, the activities and functionalities of the auxiliary brake circuit 54, the road grade circuit 58, the vehicle speed circuit 62, the automated driving system 66 (when included with the controller 34, or certain parts/functions thereof), and the speed reduction circuit 70 may be combined in multiple circuits or as a single circuit. Additional circuits with additional functionality may also be included. Further, the controller 34 may further control other activity beyond the scope of the present disclosure.

As mentioned above and in one configuration, the "circuits" may be implemented in machine-readable medium for execution by various types of processors, such as the processor 42 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method process, the order of such processes may differ from what is depicted and described, unless specified differently above. Also, two or more processes may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various processing processes, comparison processes, and decision processes.

It is important to note that the construction and arrangement of the vehicle 10 as shown in the various exemplary embodiments is illustrative only. Additionally, any element disclosed in one embodiment may be incorporated or utilized with any other embodiment disclosed herein. For example, the speed reduction circuit 70, or other circuits, of the exemplary embodiment may be incorporated in the automated driving system 66. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for a vehicle, the system comprising:
a controller including one or more processing circuits comprising one or more memory devices coupled to one or more processors, the one or more memory devices configured to store instructions thereon that, when executed by the one or more processors, cause the one or more processors to:
receive data regarding operation of an auxiliary brake system of the vehicle;
determine an auxiliary brake fault condition based on the received data regarding operation of the auxiliary brake system;
determine that a vehicle speed is greater than a requested vehicle speed; and
control a transmission to downshift at least one setting relative to a current transmission setting.

2. The system of claim 1, wherein the vehicle speed is determined to be greater than the requested vehicle speed for a negative road grade.

3. The system of claim 1, wherein the one or more memory devices store instructions thereon that, when executed by the one or more processors, further cause the one or more processors to:
provide a prompt, via a user interface of the vehicle, to an operator to manually implement the downshift of the transmission.

4. The system of claim 1, wherein the one or more memory devices store instructions thereon that, when executed by the one or more processors, further cause the one or more processors to activate at least one of the following in response to determining the vehicle speed being greater than the requested vehicle speed:
an electromagnetic retarder,
a transmission retarder,
a parasitic load,
an engine brake, or
a regenerative braking system.

5. The system of claim 4, wherein the parasitic load is activated, and wherein the parasitic load includes at least one of an air conditioning compressor or a radiator fan.

6. The system of claim 1, wherein the one or more memory devices store instructions thereon that, when executed by the one or more processors, further cause the one or more processors to:
receive information ahead of the vehicle; and
determine that the vehicle will experience a negative road grade in a predefined distance based on the information ahead of the vehicle.

7. The system of claim 1, wherein the one or more memory devices store instructions thereon that, when executed by the one or more processors, further cause the one or more processors to:
identify an existing auxiliary brake fault; and
modify the requested vehicle speed to a modified requested vehicle speed that is lower than the requested vehicle speed in response to identifying the existing auxiliary brake fault.

8. A method comprising:
receiving, by a controller, data regarding operation of an auxiliary brake system of a vehicle;
determining, by the controller, an auxiliary brake fault condition based on the received data regarding operation of the auxiliary brake system;
determining, by the controller, a vehicle speed that is greater than a requested vehicle speed; and
controlling, by the controller, a transmission to downshift at least one setting relative to a current transmission setting.

9. The method of claim 8, further comprising:
determining, by the controller, that the vehicle is on or is about to experience a negative road grade, wherein the controller determines that the vehicle speed is greater than the requested vehicle speed for the negative road grade.

10. The method of claim 8, further comprising:
providing, by the controller, a prompt via a user interface of the vehicle to an operator to manually implement the downshift of the transmission.

11. The method of claim 8, further comprising activating, by the controller, at least one of the following in response to determining the vehicle speed is greater than the requested vehicle speed:
an electromagnetic retarder,
a transmission retarder,
a parasitic load,
an engine brake, or
a regenerative braking system.

12. The method of claim 11, wherein the parasitic load is activated, and wherein the parasitic load includes at least one of an air conditioning compressor or a radiator fan.

13. The method of claim 8, further comprising:
receiving, by the controller, information ahead of the vehicle; and
determining, by the controller, that the vehicle is about to experience a negative road grade in a predefined distance based on the information ahead of the vehicle.

14. The method of claim 8, further comprising:
identifying, by the controller, an existing auxiliary brake fault; and
modifying, by the controller, the requested vehicle speed to a modified requested vehicle speed that is lower than the requested vehicle speed in response to identifying the existing auxiliary brake fault.

15. A system comprising an automated driving system configured to enable autonomous operation of a vehicle, the system comprising:

a controller including one or more processing circuits comprising one or more memory devices coupled to one or more processors, the one or more memory devices configured to store instructions thereon that, when executed by the one or more processors, cause the one or more processors to:

receive data regarding operation of an auxiliary brake system of the vehicle;

determine an auxiliary brake fault condition based on the received data regarding operation of the auxiliary brake system;

receive a requested vehicle speed from the automated driving system;

determine a vehicle speed is greater than the requested vehicle speed; and control a transmission to downshift at least one setting relative to a current transmission setting.

16. The system of claim 15, wherein the one or more memory devices store instructions thereon that, when executed by the one or more processors, further cause the one or more processors to:

provide a prompt, via a user interface of the vehicle, to an operator to manually implement the downshift of the transmission.

17. The system of claim 15, wherein the one or more memory devices store instructions thereon that, when executed by the one or more processors, further cause the one or more processors to activate at least one of the following in response to determining the vehicle speed is greater than the requested vehicle speed:

an electromagnetic retarder, a transmission retarder, a parasitic load, an engine brake, or a regenerative braking system.

18. The system of claim 15, wherein the auxiliary brake system is an engine brake system.

19. The system of claim 15, wherein the one or more memory devices store instructions thereon that, when executed by the one or more processors, further cause the one or more processors to:

receive look ahead information; and determine that the vehicle will experience a negative road grade in a predefined distance based on the look ahead information.

20. The system of claim 15, wherein the one or more memory devices store instructions thereon that, when executed by the one or more processors, further cause the one or more processors to:

identify an existing auxiliary brake fault; and modify the requested vehicle speed to a modified requested vehicle speed that is lower than the requested vehicle speed in response to identifying the existing auxiliary brake fault.

* * * * *